US010020481B2

(12) United States Patent
Kim et al.

(10) Patent No.: US 10,020,481 B2
(45) Date of Patent: Jul. 10, 2018

(54) SEPARATOR AND SECONDARY BATTERY USING SAME

(71) Applicant: SAMSUNG SDI CO., LTD., Yongin-si, Gyeonggi-do (KR)

(72) Inventors: Nam Hyo Kim, Suwon-si (KR); Kee Wook Kim, Suwon-si (KR); Yang Seob Kim, Suwon-si (KR); Hyo Sang Yun, Suwon-si (KR); Yong Bae Lee, Suwon-si (KR); Jung Min Lee, Suwon-si (KR); Jung Yoon Lee, Suwon-si (KR); Ji Hyun Chun, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/038,306

(22) PCT Filed: Nov. 20, 2014

(86) PCT No.: PCT/KR2014/011180
§ 371 (c)(1),
(2) Date: May 20, 2016

(87) PCT Pub. No.: WO2015/076575
PCT Pub. Date: May 28, 2015

(65) Prior Publication Data
US 2016/0293923 A1 Oct. 6, 2016

(30) Foreign Application Priority Data

Nov. 21, 2013 (KR) .................. 10-2013-0142324
Apr. 7, 2014 (KR) .................. 10-2014-0041124
Oct. 2, 2014 (KR) .................. 10-2014-0133341

(51) Int. Cl.
*H01M 2/16* (2006.01)
*H01M 10/052* (2010.01)
(Continued)

(52) U.S. Cl.
CPC ......... *H01M 2/1686* (2013.01); *C08F 218/08* (2013.01); *C08J 7/042* (2013.01);
(Continued)

(58) Field of Classification Search
CPC .............. H01M 2/1686; H01M 2/166; H01M 10/0525; H01M 10/058; H01M 2/1673; H01M 2/1653
See application file for complete search history.

(56) References Cited

U.S. PATENT DOCUMENTS

2003/0039886 A1  2/2003  Zhang et al.
2009/0123828 A1  5/2009  Kono et al.
(Continued)

FOREIGN PATENT DOCUMENTS

CN   101872853 A   10/2010
JP   2002-256129   9/2002
(Continued)

OTHER PUBLICATIONS

International Search Report for PCT/KR2014/011178.
(Continued)

*Primary Examiner* — Stewart A Fraser
(74) *Attorney, Agent, or Firm* — Lee & Morse, P.C.

(57) ABSTRACT

The present invention relates to a separator comprising a porous substrate and an adhesive layer on one surface or both surfaces of the porous substrate, wherein the adhesive layer includes an acryl-based copolymer containing a (meth) acrylate-based monomer-derived repeating unit and having
(Continued)

a weight average molecular weight of 400,000 g/mol to 750,000 g/mol; and to a secondary battery comprising the separator.

17 Claims, 2 Drawing Sheets

(51) Int. Cl.

| | | |
|---|---|---|
| *C08J 7/04* | (2006.01) | |
| *H01M 4/04* | (2006.01) | |
| *H01M 4/131* | (2010.01) | |
| *H01M 4/133* | (2010.01) | |
| *H01M 4/1391* | (2010.01) | |
| *H01M 4/1393* | (2010.01) | |
| *H01M 4/525* | (2010.01) | |
| *H01M 4/587* | (2010.01) | |
| *H01M 4/62* | (2006.01) | |
| *H01M 10/0525* | (2010.01) | |
| *H01M 10/0565* | (2010.01) | |
| *H01M 10/058* | (2010.01) | |
| *C09J 131/04* | (2006.01) | |
| *C09J 133/06* | (2006.01) | |
| *C09D 127/16* | (2006.01) | |
| *C08F 218/08* | (2006.01) | |
| *C09J 133/08* | (2006.01) | |
| *H01M 4/02* | (2006.01) | |

(52) U.S. Cl.
CPC .......... *C09D 127/16* (2013.01); *C09J 131/04* (2013.01); *C09J 133/06* (2013.01); *C09J 133/08* (2013.01); *H01M 2/162* (2013.01); *H01M 2/166* (2013.01); *H01M 2/168* (2013.01); *H01M 2/1653* (2013.01); *H01M 2/1673* (2013.01); *H01M 4/0404* (2013.01); *H01M 4/0435* (2013.01); *H01M 4/131* (2013.01); *H01M 4/133* (2013.01); *H01M 4/1391* (2013.01); *H01M 4/1393* (2013.01); *H01M 4/525* (2013.01); *H01M 4/587* (2013.01); *H01M 4/622* (2013.01); *H01M 4/623* (2013.01); *H01M 4/625* (2013.01); *H01M 10/052* (2013.01); *H01M 10/058* (2013.01); *H01M 10/0525* (2013.01); *H01M 10/0565* (2013.01); *C08J 2323/06* (2013.01); *C08J 2427/16* (2013.01); *C08J 2433/10* (2013.01); *H01M 2004/021* (2013.01); *H01M 2004/027* (2013.01); *H01M 2004/028* (2013.01); *H01M 2220/30* (2013.01)

(56) References Cited

U.S. PATENT DOCUMENTS

| | | |
|---|---|---|
| 2009/0208838 A1 | 8/2009 | Kim |
| 2010/0316903 A1 | 12/2010 | Kim et al. |
| 2013/0183519 A1* | 7/2013 | Maeda ................. H01G 11/14 428/337 |
| 2013/0189561 A1 | 7/2013 | Kim et al. |
| 2013/0224552 A1 | 8/2013 | Hong et al. |
| 2014/0308565 A1 | 10/2014 | Lee et al. |
| 2015/0372277 A1* | 12/2015 | Honda ................ H01M 2/1653 429/145 |

FOREIGN PATENT DOCUMENTS

| | | |
|---|---|---|
| JP | 2004-063343 A | 2/2004 |
| JP | 2011-162603 A | 8/2011 |
| JP | 2012-089444 A | 5/2012 |
| JP | 2013-101954 | 5/2013 |
| JP | 2013-168373 A | 8/2013 |
| JP | 2013-197078 | 9/2013 |
| JP | 2014-026986 | 2/2014 |
| JP | 2014-063343 | 4/2014 |
| KR | 10-2001-0012587 | 2/2001 |
| KR | 10-2006-0072065 A | 6/2006 |
| KR | 10-0727248 | 6/2007 |
| KR | 10-2007-0077231 A | 7/2007 |
| KR | 10-2007-0104689 | 10/2007 |
| KR | 10-0775310 | 11/2007 |
| KR | 10-2008-0101043 | 11/2008 |
| KR | 10-2009-0063445 A | 6/2009 |
| KR | 2009-0056811 A | 6/2009 |
| KR | 10-2010-0059933 | 6/2010 |
| KR | 10-2011-0056911 | 5/2011 |
| KR | 10-2011-0057079 | 5/2011 |
| KR | 10-2011-0104791 A | 9/2011 |
| KR | 10-2012-0025619 A | 3/2012 |
| KR | 10-2012-0108686 A | 10/2012 |
| KR | 10-2012-0112397 | 10/2012 |
| KR | 10-2013-0067684 A | 6/2013 |
| KR | 10-2013-0083211 | 7/2013 |
| KR | 10-2013-0092245 A | 8/2013 |
| KR | 10-2013-0093977 | 8/2013 |
| KR | 10-2013-0096138 | 8/2013 |
| KR | 10-2013-0099545 | 9/2013 |
| KR | 10-2013-0114926 A | 10/2013 |
| KR | 10-2013-0123568 | 11/2013 |
| KR | 10-2013-0126445 A | 11/2013 |
| KR | 2014-0055901 A | 5/2014 |
| WO | WO 2014/147888 A1 | 9/2014 |

OTHER PUBLICATIONS

International Search Report for PCT/KR2014/011179.
International Search Report for PCT/KR2014/011234.
International Search Report for PCT/KR2014/011252.
U.S. Office Action dated Dec. 20, 2017, in copending U.S. Appl. No. 15/038,352.
USPTO Office action dated Aug. 15, 2017, in U.S. Appl. No. 15/038,352.
U.S. Appl. No. 15/038,274, filed May 20, 2016, R.S. Carrico.
U.S. Appl. No. 15/038,352, filed May 20, 2016, Y. Takeuchi.
U.S. Office Action dated Mar. 26, 2018, in copending U.S. Appl. No. 15/038,274.
U.S. Office Action dated Apr. 30, 2018, in copending U.S. Appl. No. 15/038,352.

* cited by examiner

SEPARATOR AND SECONDARY BATTERY USING SAME

CROSS REFERENCE TO RELATED APPLICATIONS

This is the U.S. national phase application based on PCT Application No. PCT/KR2014/011180, filed Nov. 20, 2014, which is based on Korean Patent Application Nos. 10-2013-0142324, filed Nov. 21, 2013, 10-2014-0041124, filed Apr. 7, 2014 and 10-2014-0133341, filed Oct. 2, 2014, the entire contents of all of which are hereby incorporated by reference.

BACKGROUND OF THE INVENTION

1. Field of the Invention

The present invention relates to a separator and a secondary battery using the same.

2. Description of the Related Art

In general, as a portable electronic device such as a video camera, a cell phone, and a portable computer is lightened and conducts high performance, research on a secondary battery as a power source for the portable electronic device is actively being made. This secondary battery may include, for example, a nickel-cadmium battery, a nickel-hydrogen battery, a nickel-zinc battery, a lithium secondary battery, and the like. Among these batteries, the lithium secondary battery may be down-sized and enlarged and also has an advantage of a high voltage and high energy density per unit weight and thus is used in many fields.

In the secondary battery, since a separator wound between electrodes may easily escape due to an area and/or weight increase according to enlargement of the separator or use of an exterior having weak shape storage stability such as a pouch type, adherence of the separator to the electrodes needs to be increased. In addition, the separator requires of excellent shape stability of the secondary battery to prevent the battery from shape change, for example, from distortion and the like due to continuous charges and discharges.

In order to improve adherence of the separator to the electrodes and heat resistance of the separator, a method of forming an organic/inorganic mixed coating layer on one surface or both surfaces of the base film of the separator has been known (Korean Registration Patent No. 10-0775310) but may not sufficiently secure desired adherence and thus not be uniformly applied to variously-sized and-shaped separators.

Accordingly, required is development of a secondary battery including a separator having adherence applicable to a secondary battery enlarged or using an exterior such as a pouch type and maintaining shape stability and the adherence after charge and discharge, an environment where the battery is actually used.

SUMMARY OF THE INVENTION

Technical Object

The present invention is to provide a separator having improved adherence to a positive electrode or a negative electrode and improved shape stability of a secondary battery after charge and discharge, and a secondary battery using the same.

Technical Solution

According to one embodiment of the present invention, a separator includes a porous substrate and an adhesive layer on one surface or both surfaces of the porous substrate and including an acryl-based copolymer containing a (meth)acrylate-based monomer-derived repeating unit and having a weight average molecular weight of 400,000 g/mol to 750,000 g/mol.

According to another embodiment of the present invention, a separator includes a porous substrate and a binder-containing adhesive layer on one surface or both surfaces of the porous substrate, wherein a transfer rate of a negative active material to the separator according to Equation 1 after charge and discharge is greater than or equal to 60%.

$$\text{Transfer rate (\%)} = (A_1/A_0) \times 100 \qquad \text{[Equation 1]}$$

In Equation 1, $A_0$ is a total area of a negative electrode, and $A_1$ is an area of a negative active material transferred to a separator when charge, discharge, and charge are sequentially performed after a positive electrode, a separator, and a negative electrode are sequentially stacked to form an electrode assembly, first compressing the electrode assembly at 20° C. to 110° C., for 1 to 5 seconds, and at a force of 1 to 30 kgf/cm², injecting an electrolyte solution to the compressed electrode assembly, and second compressing the same at 60° C. to 110° C., for 30 seconds to 180 seconds, at a force of 1 to 30 kgf/cm².

According to another embodiment of the present invention, a secondary battery including the separator according to the embodiment, particularly a lithium secondary battery is provided.

Advantageous Effect

A separator according to embodiments of the present invention may minimize a battery shape change under an environment of repetitive expansion and shrinkage of a battery according to repetitively charges and discharges of the battery and thus increase of battery internal resistance due to a non-uniform distance between electrodes or deterioration of battery performance according to the internal resistance increase. The separator according to the present invention may maintain highly efficient charge and discharge characteristics due to improved shape stability.

DETAILED DESCRIPTION OF THE EMBODIMENTS

Figure 1:
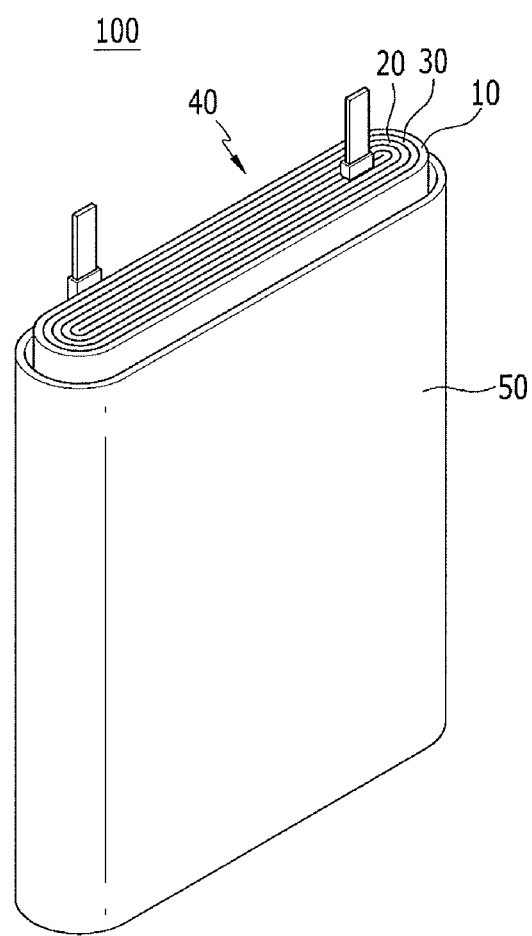
FIG. 1 is an exploded perspective view showing a secondary battery according to one embodiment.

Hereinafter, the present invention is described in detail. The disclosures that are not described in the present specification may be fully recognized and by conveyed by those skilled in the art in a technical or similar field of the present invention and thus are omitted herein.

In one embodiment of the present invention, a separator includes a porous substrate and an adhesive layer on one surface or both surfaces of the porous substrate and including an acryl-based copolymer containing a (meth)acrylate-based monomer-derived repeating unit and having a weight average molecular weight of 400,000 g/mol to 750,000 g/mol.

The porous substrate may have a plurality of pore and may generally be a porous substrate used in an electrochemical device. Non-limiting examples of the porous substrate may be a polymer film formed of a polymer or a mixture of two or more of polyethylene, polypropylene, polyethyleneterephthalate, polybutyleneterephthalate, polyester, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, and polyethylenenaphthalene.

For example, the porous substrate may be a polyolefin-based substrate, and the polyolefin-based substrate may improve safety of a battery due to its improved shut-down function. The polyolefin-based substrate may be, for example, selected from a polyethylene single film, a polypropylene single film, a polyethylene/polypropylene double film, a polypropylene/polyethylene/polypropylene triple film, and a polyethylene/polypropylene/polyethylene triple film. For another example, the polyolefin-based resin may include a non-olefin resin in addition to an olefin resin or a copolymer of olefin and a non-olefin monomer.

A thickness of the porous substrate may be 1 μm to 40 μm, for example 5 μm to 15 μm. Within the thickness range, a separator may have a desirable thickness that is thick to prevent a short-circuit between the positive electrode and the negative electrode of a battery and is also not thick to increase internal resistance.

The adhesive layer may be formed of an adhesive layer composition, and the adhesive layer composition may include an acryl-based copolymer having a weight average molecular weight of 400,000 g/mol to 750,000 g/mol, and a solvent. The weight average molecular weight of the acryl-based copolymer may be specifically 430,000 g/mol to 700,000 g/mol.

The acryl-based copolymer may include, for example, a (meth)acrylate-based monomer-derived repeating unit. In addition, the acryl-based copolymer may further include an acetate group-containing monomer-derived repeating unit in addition to the (meth)acryl-based monomer-derived repeating unit. When the binder of the adhesive layer is the acryl-based copolymer that has a (meth)acrylate-based monomer-derived repeating unit and/or an acetate group-containing monomer-derived repeating unit and has a weight average molecular weight of 400,000 g/mol to 750,000 g/mol, shape deformation of a battery may be minimized under an environment of repetitive expansion and shrinkage that is a separator is actually used. The weight average molecular weight of the acryl-based copolymer may be different according to an amount of a polymerization initiator during preparation of a copolymer, and as an amount of a polymerization initiator increases, a weight average molecular weight of the acryl-based copolymer decreases.

A glass transition temperature (Tg) of the acryl-based copolymer may be less than or equal to 100° C., for example, 20° C. to 60° C. Within the ranges, it is advantageous for good adherence and thus improvement of a shrinkage ratio and heat resistance at a temperature where a separator is positioned between electrodes followed by being compressed.

The acryl-based copolymer having a (meth)acrylate-based monomer-derived repeating unit and/or an acetate group-containing monomer-derived repeating unit used in the present invention is not particularly limited as long as it provides good adherence between the positive electrode and the negative electrode, and for example, the acryl-based copolymer may be a copolymer by polymerizing at least one (meth)acrylate-based monomer selected from the group consisting of butyl (meth)acrylate, propyl (meth)acrylate, ethyl (meth)acrylate, and methyl (meth)acrylate. Or, the acryl-based copolymer may be a copolymer of at least one (meth)acrylate-based monomer selected from the group consisting of butyl (meth)acrylate, propyl (meth)acrylate, ethyl (meth)acrylate, and methyl (meth)acrylate and an acetate group-containing monomer selected from the group consisting of vinyl acetate and allyl acetate.

The acetate group-containing monomer-derived repeating unit may be a repeating unit of Chemical Formula 1:

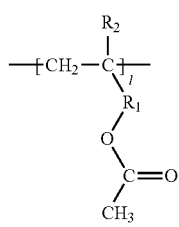

[Chemical Formula 1]

In Chemical Formula 1, $R_1$ is a single bond or a linear or branched C1 to C6 alkyl, $R_2$ is hydrogen or methyl, and $l$ is an integer of 1 to 100.

The acryl-based copolymer may be prepared by polymerizing the (meth)acrylate-based monomer and other monomers, specifically an acetate group-containing monomer in a mole ratio 3:7 to 7:3, specifically 4:6 to 6:4, and more specifically about 5:5. The acryl-based copolymer may be prepared by a polymerization reaction of, for example, a butyl (meth)acrylate monomer, methyl (meth)acrylate monomer and vinyl acetate and/or allyl acetate monomer, in a mole ratio of 3 to 5:0.5 to 1.5:3.0 to 6.5, and specifically, 4:1:5.

Non-limiting example of the solvent may be dimethyl formamide, dimethylsulfoxide, dimethyl acetamide, dimethylcarbonate, or N-methylpyrrolidone. A content of the solvent may be 20 wt % to 99 wt %, specifically 50 wt % to 95 wt %, and more specifically 70 wt % to 95 wt % based on a weight of the adhesive layer composition. When the solvent is included within the range, an adhesive layer composition may be easily prepared and a drying process of an adhesive layer may be easily performed.

In another embodiment of the present invention, the adhesive layer composition may further include other binder resins in addition to the acryl-based copolymer. Adherence and heat resistance may be further improved by further including other binder resins in addition to the acryl-based copolymer. Examples of an additional binder may be one or mixture thereof selected from a polyvinylidene fluoride (PVdF) homopolymer, a polyvinylidene fluoride-hexafluoropropylene copolymer (PVdF-HFP), polymethylmethacrylate, polyacrylonitrile, polyvinylpyrrolidone, polyvinylacetate, polyethylene oxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxyl methyl cellulose, and an acrylonitrile styrene butadiene copolymer.

A weight ratio of the acryl-based copolymer and the additional binder may be 9.9:0.1 to 2.5:7.5. Specifically it may be 9.9:0.1 to 5:5, and more specifically 9:1 to 7:3. Within the ranges, a secondary battery having improved heat resistance while the separator maintains sufficient adherence to an electrode.

The additional binder may be a polyvinylidene fluoride-based polymer, for example, one or more of a polyvinylidene fluoride homopolymer, a polyvinylidene fluoride copolymer, and modified polymers thereof. Specifically, a polyvinylidene fluoride homopolymer or a polyvinylidene fluoride-hexafluoropropylene copolymer may be used. In addition, the PVdF-based binder may have a weight average molecular weight (Mw) of, for example, 500,000 to 1,700,000 (g/mol). For specific example, the PVdF-based binder may have a weight average molecular weight (Mw) of 1,000,000 to 1,500,000 (g/mol). For another example, two or more binders having different weight average molecular weights may be mixed. For example, a binder having a weight average molecular weight of less than 1,000,000 g/mol and a binder having a weight average molecular weight of greater than or equal to 1,000,000 g/mol may be mixed. When the PVdF-based binder having the molecular weight within the range is used, adherence between the adhesive layer and the porous substrate is fortified, a porous substrate that is weak against heat may be effectively prevented from being contracted, a separator having sufficiently improved electrolyte impregnation properties may be prepared, and a battery effectively generating electrical output may be manufactured.

In another example of the present invention, the adhesive layer composition may further include an inorganic particle. The inorganic particle used in the present invention is not particularly limited, and may be an inorganic particle that is generally in this filed. Non-limiting examples of the inorganic particle used in the present invention may be $Al_2O_3$, $SiO_2$, $B_2O_3$, $Ga_2O_3$, $TiO_2$, or $SnO_2$. These may be used alone or in a mixture of two or more. The inorganic particle used in the present invention may be, for example, $Al_2O_3$ (alumina).

A size of the inorganic particle used in the present invention is not particularly limited, and its average particle diameter may be 1 nm to 2,000 nm, for example, 100 nm to 1,000 nm, or 300 nm to 500 nm. When the inorganic particle having the size within the ranges, dispersibility of the inorganic particle in the adhesive layer composition and formation processibility of the adhesive layer may be prevented from being deteriorated, a thickness of the adhesive layer may be appropriately controlled and thus reduction of mechanical properties and increase of electrical resistance may be prevented. In addition, sizes of pores generated in the separator are appropriately controlled and thus internal a possibility of short-circuit may be reduced during charge and discharge of a battery.

In the adhesive layer, the inorganic particle may be included in an amount of 50 wt % to 99 wt %, specifically 75 wt % to 95 wt %, and more specifically 80 wt % to 90 wt % based on a total weight of the adhesive layer. When the inorganic particle is included within the range, the inorganic particle may sufficiently exert heat dissipation properties, and when used to form an adhesive layer on a separator, the separator may be effectively suppressed from a thermal shrinkage.

According to another embodiment of the present invention, a separator includes a porous substrate and a binder-containing adhesive layer formed on one surface or both surfaces of the porous substrate, and a transfer rate of a negative active material to the separator according to Equation 1 after charge and discharge is greater than or equal to 60%.

$$\text{Transfer rate (\%)} = (A_1/A_0) \times 100 \quad \text{[Equation 1]}$$

In Equation 1, $A_0$ is a total area of a negative electrode, and $A_1$ is an area of a negative active material transferred to a separator when charge, discharge, and charge are sequentially performed after a positive electrode, a separator, and a negative electrode are sequentially stacked to form an electrode assembly, first compressing the electrode assembly at 20° C. to 110° C., for 1 second to 5 seconds, and at a force of 1 kgf/cm² to 30 kgf/cm², injecting an electrolyte solution to the compressed electrode assembly, and second compressing the same at 60° C. to 110° C., for 30 seconds to 180 seconds, at a force of 1 kgf/cm² to 30 kgf/cm².

The area of the negative active material may be measured in any method if it may measure the area without a particular limit but, for example, measured by using a known image analyzer (ex: Easy Measure converter 1.0.0.4) after taking an image of the separator with a known image camera (ex: a high resolution camera, Lumenera Corp.).

Examples of conditions of the charge, discharge, and charge are shown in Table 1:

TABLE 1

| Charge/discharge/charge | (charge) 4.35 V, 0.2 C, 50 mA cut-off | 5 hrs |
|---|---|---|
| | (discharge) 0.2 C, 3 V cut-off | 5 hrs |
| | (charge) 0.5 C, 4.35 V cut-off | 2 hrs |

A transfer rate of greater than or equal to 60% of the negative active material into the separator is related to battery shape stability after charge and discharge and adherence of the separator to a positive or negative electrode. Since a transfer rate of a positive active material to a separator is in general larger than a transfer rate of a negative active material, only the transfer rate of the negative active material may secure satisfactory battery shape stability after charge and discharge and satisfactory adherence of the separator to a positive or negative electrode in the present invention. The transfer rate may be specifically greater than or equal 65%, more specifically greater than or equal 70%, and even more specifically greater than or equal 75%. In the above example, the aforementioned acryl-based copolymer may be used as a binder in an adhesive layer, and a different kind of binder resin, an inorganic particle, a solvent, or the like may be used in the same method, kind, and amount as above.

The separator according to embodiments of the present invention may have air permeation of less than or equal to 500 sec/100 cc, specifically 50 sec/100 cc to 400 sec/100 cc, and more specifically 50 sec/100 cc to 300 sec/100 cc.

The separator according to embodiments of the present invention may have a tensile strength of greater than or equal to 1750 kg/cm² in an MD direction and greater than or equal to 1700 kg/cm² in a TD direction. Specifically, the separator may have a tensile strength of 1750 kg/cm² to 2550 kg/cm² in an MD direction and 1700 kg/cm² to 2500 kg/cm² in a TD direction. The separator according to the embodiments of the present invention may show satisfactory basic properties such as air permeation, mechanical strength, and the like as well as excellent shape stability and adherence after charge and discharge.

Hereinafter, a method of manufacturing a separator according to an example embodiment of one aspect is illustrated. A method of manufacturing a separator according to one embodiment of the present invention includes forming an adhesive layer composition including a binder including an acryl-based copolymer including a (meth)acrylate-based monomer-derived repeating unit and having a weight average molecular weight of 400,000 g/mol to 750,000 g/mol, and a solvent, and forming an adhesive layer with the composition on one surface or both surfaces of the porous substrate the adhesive layer.

First, the forming of the adhesive layer composition may include mixing the binder including the acryl-based copolymer disclosed herein and the solvent and stirring them at 10° C. to 40° C. for 30 minutes to 5 hour. When an inorganic particle is included, an inorganic particle may be included in the stirred solution. Herein, a content of a solid may be 10 parts to 20 parts by weight based on the adhesive layer composition, and in the solid, a weight ratio of the binder and the inorganic particle may be 3:7 to 0.1:9.9.

Or, the inorganic particle is dispersed in a dispersion medium to prepare an inorganic dispersion liquid, and then this is mixed with a polymer solution including a binder including an acryl-based copolymer and a solvent to prepare an adhesive layer composition. When the inorganic dispersion liquid is separately prepared as above, dispersibility and composition stability of the inorganic particle and the binder may be improved. Accordingly, when the adhesive layer composition is prepared according to another aspect of the present invention, the binder component and the inorganic particle are respectively dissolved or dispersed in each appropriate solvent and then, mixed. For example, the adhesive layer composition may be prepared by respectively dissolving the acryl-based copolymer and a polyvinylidene fluoride-based polymer in each appropriate solvent to obtain each solution and dispersing an inorganic particle to prepare an inorganic dispersion liquid and then, mixing all the solutions with an appropriate solvent. The mixing may be performed by using a ball mill, a beads mill, a screw mixer, or the like.

Subsequently, an adhesive layer is formed on one surface or both surfaces of the porous substrate using the adhesive layer composition. The method of forming the adhesive layer on the porous substrate is not particularly limited, and may be a general method in the related art of the present invention, for example a coating method, lamination, coextrusion, and the like. Non-limiting examples of the coating method may be a dip coating, die coating, roll coating, or comma coating method. These methods may be used alone or in combination thereof. The adhesive layer of the separator of the present invention may be, for example formed by a dip coating method.

A thickness of the adhesive layer according to the present example embodiment may be 0.01 μm to 20 μm, specifically 1 μm to 10 μm, and more specifically 1 μm to 5 μm. Within the thickness ranges, excellent thermal stability and adherence may be obtained due to an adhesive layer having an appropriate thickness, and internal resistance of a battery is suppressed from being increase by preventing an entire thickness of a separator from being extremely thick.

In the present example embodiment, the drying of the adhesive layer may be performed through drying with warm air, hot air, or low humid air, vacuum-drying, or radiation of a far-infrared ray, an electron beam. A drying temperature may be different according to the kind of the solvent but the drying may be performed at 60° C. to 120° C. A drying time may also be different according to the kind of the solvent but the drying may be performed for 1 minute to 1 hour. In one specific embodiment, the drying may be performed at a temperature of 70° C. to 120° C. for 1 minute to 30 minutes, or 1 minute to 10 minutes.

According to one embodiment of the present invention, a secondary battery includes a positive electrode; a negative electrode; the separator of the present invention between the positive electrode and the negative electrode; and an electrolyte. The secondary battery is not particularly limited, and may be any known in this of the present invention. The secondary battery of the present invention may be specifically a lithium secondary battery such as a lithium metal secondary battery, a lithium ion secondary battery, a lithium polymer secondary battery or a lithium ion polymer secondary battery. A method of manufacturing the secondary battery of the present invention is not particularly limited, and a general method in this art of the present invention may be used. Non-limiting examples of a method of manufacturing the secondary battery are as follows: placing a separator including the adhesive layer of the present invention between the positive electrode and the negative electrode of a battery, and filling an electrolyte solution.

Figure 2:
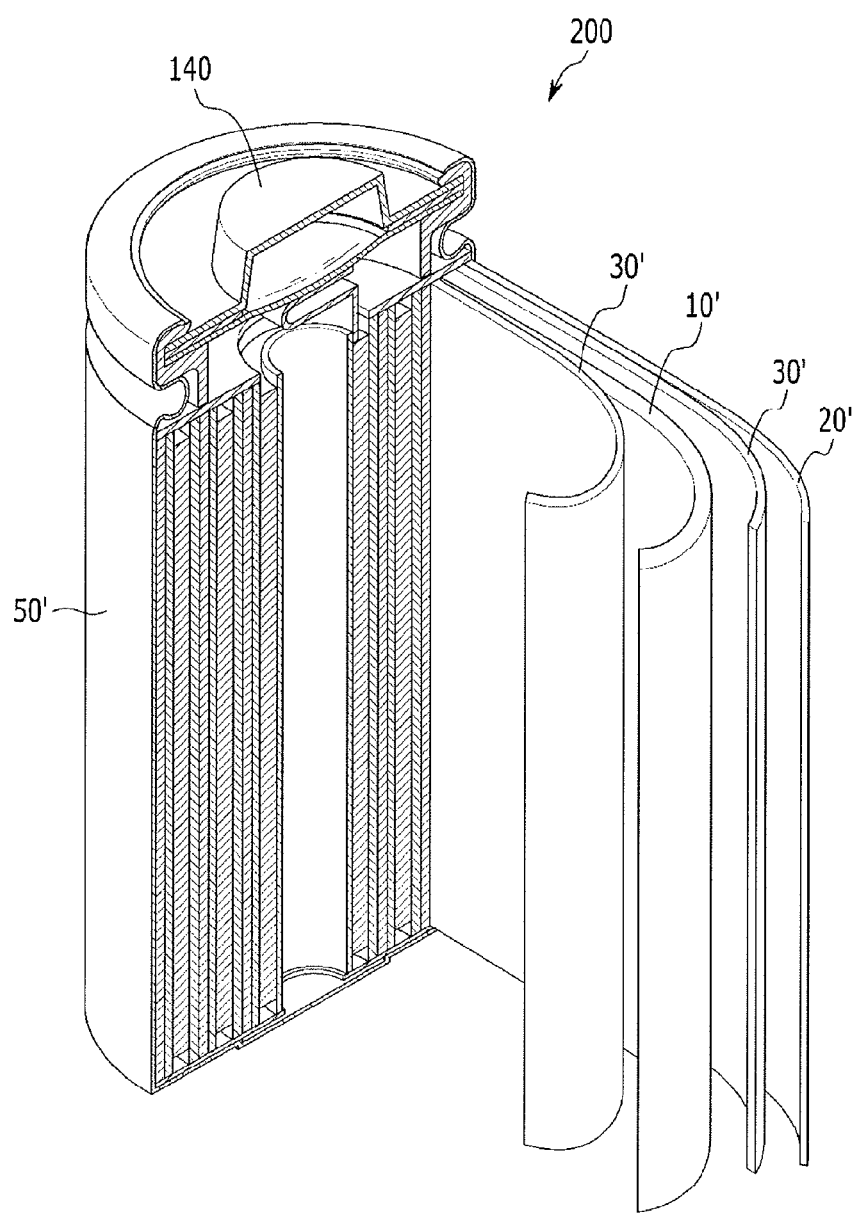
FIG. 2 is an exploded perspective view showing a secondary battery according to another embodiment.

FIGS. 1 and 2 are exploded perspective view of secondary batteries according to one embodiment or another embodiment. A secondary battery according to one embodiment is for example illustrated with a prismatic battery or cylindrical battery, but the present invention is not limited thereto, and the separator may be applied to various batteries such as a pouch-type battery and a cylindrical battery. Referring to FIGS. 1 and 2, secondary batteries 100 and 200 according to one embodiment a wound electrode assembly 40 including separators 30 and 30' between positive electrodes 10 and 10' and negative electrodes 20 and 20', and cases 50 and 50' housing the electrode assembly 40

The positive electrode 10 and 10', the negative electrode 20 and 20' and the separator 30 and 30' are impregnated in an electrolyte solution (not shown).

The separators 30 and 30' are the same as described above.

The positive electrodes 10 and 10' include a positive current collector and a positive active material layer formed on the positive current collector. The positive active material layer includes a positive active material, a binder, and optionally a conductive material. The positive current collector may use aluminum (Al), nickel (Ni), and the like, but is not limited thereto. The positive active material may use a compound being capable of intercalating and deintercalating lithium. Specifically at least one of a composite oxide or a composite phosphate of a metal selected from cobalt, manganese, nickel, aluminum, iron, or a combination thereof and lithium may be used. More specifically, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof. The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more. The conductive material improves conductivity of an electrode and examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrodes 20 and 20' include a negative current collector and a negative active material layer formed on the negative current collector. The negative current collector may use copper (Cu), gold (Au), nickel (Ni), a copper alloy, and the like, but is not limited thereto.

The negative active material layer may include a negative active material, a binder and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous shape, plate shape, flake shape, spherical shape or fiber shape natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode may be the same as the binder and conductive material of the positive electrode.

The positive electrode and the negative electrode may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent and a lithium salt. The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent. Examples of the carbonate-based solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Particularly, when the linear carbonate compounds and cyclic carbonate compounds are mixed, an organic solvent having a high dielectric constant and a low viscosity may be provided. The cyclic carbonate compound and the linear carbonate compound are mixed together in a volume ratio ranging from 1:1 to 1:9.

Examples of the ester-based solvent may be methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like. Examples of the ketone-based solvent may be cyclohexanone, and the like, and examples of the alcohol-based solvent may be ethanol, isopropyl alcohol, and the like.

The organic solvent may be used singularly or in a mixture of two or more, and when the organic solvent is used in a mixture of two or more, the mixture ratio may be controlled in accordance with a desirable cell performance. The lithium salt is dissolved in an organic solvent, supplies lithium ions in a battery, basically operates a secondary battery, and improves lithium ion transportation between positive and negative electrodes therein.

Examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, x and y are natural numbers, LiCl, LiI, $LiB(C_2O_4)_2$, or a combination thereof.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

DETAILED DESCRIPTION

Hereinafter, Examples, Comparative Examples and Experimental Examples are provided in order to illustrate the present invention in detail. However, the following Examples, Comparative Examples, and Experimental Examples are examples of the present invention and are not to be construed as limiting the present invention.

EXAMPLES

Preparation Example 1

Preparation of Acryl-based Copolymer

Butyl methacrylate (BMA), methyl methacrylate, vinyl acetate (VAc) in a mole ratio of 4/1/5 were put in deionized water (DIW), and dodecyl sulfate sodium salt (SDS, 85.0%) as an emulsifier and ammonium persulfate (APS, 98.0%) as a polymerization initiator in each amount of 0.8 wt % and 0.3 wt % based on the total weight of each monomer were added thereto. The mixed solution was put in a thermostat and heated up to 80° C. while stirred and then, reacted for 2 hours, synthesizing an acryl-based copolymer.

The obtained emulsion was cooled down to room temperature and added to a 2 wt % ammonium sulfate aqueous solution while stirred, and a polymer resin precipitated therein was obtained. The obtained polymer was separated from the solvent and then, washed with distilled water and dried, obtaining an acryl-based copolymer. The obtained acryl-based copolymer had a weight average molecular weight (Mw) of 695,000 g/mol when measured through gel permeation chromatography (GPC) (a standard sample: polystyrene).

The weight average molecular weight was specifically measured as follows: the obtained acryl-based copolymer in a concentration of 0.1 w/v % was dissolved in a THF (tetrahydrofuran) solvent (a HPLC level) for about 3 hours to prepare a sample solution for a GPC analysis, and when chromatography was performed by using a GPC equipment under the conditions provided in Table 2, the acryl-based copolymer showed a peak at retention time=10-21 minutes. The molecular weight of the acryl-based copolymer was obtained by using a PS (polystyrene) standard material from the corresponding peak.

TABLE 2

| Equipment | Waters 1515 (Pump) |
|---|---|
| GPC column | No Guard Column, Shodex KF807L + KF806L |
| Flow rate | 1 mL/min |
| Column temperature | 40° C. |
| Detector temperature | 35° C. |
| Injection volume | 100 μl |

Preparation Example 2

Preparation of Acryl-based Copolymer

An acryl-based copolymer was obtained according to the same method as Preparation Example 1 except for using 0.5 wt % of an ammonium persulfate (APS, 98.0%) polymerization initiator based on the total weight of a monomer. When measured according to the same method as Preparation Example 1, the acryl-based copolymer had a weight average molecular weight (Mw) of 510,000 g/mol.

Preparation Example 3

Preparation of Acryl-based Copolymer

An acryl-based copolymer was obtained according to the same method as Preparation Example 1 except for using 1.20 wt % of an ammonium persulfate (APS, 98.0%) polymerization initiator based on the total weight of a monomer. The acryl-based copolymer had a weight average molecular weight (Mw) of 440,000 g/mol, when measured according to the same method as Preparation Example 1.

Preparation Example 4

Preparation of Acryl-based Copolymer

An acryl-based copolymer was obtained according to the same method as Preparation Example 1 except for using 0.15 wt % of an ammonium persulfate (APS, 98.0%) polymerization initiator based on the total weight of a monomer. The acryl-based copolymer had a weight average molecular weight (Mw) of 770,000 g/mol, when measured according to the same method as Preparation Example 1.

Preparation Example 5

Preparation of Acryl-based Copolymer

An acryl-based copolymer was obtained according to the same method as Preparation Example 1 except for using 2.30 wt % of an ammonium persulfate (APS, 98.0%) polymerization initiator based on the total weight of a monomer. The acryl-based copolymer had a weight average molecular weight (Mw) of 360,000 g/mol, when measured according to the same method as Preparation Example 1.

Table 3 shows the amounts of the polymerization initiator, the weight average molecular weight of each acryl-based copolymer according to Preparation Examples 1 to 5, and a composition ratio of each monomer-derived repeating unit among the acryl-based copolymers.

TABLE 3

| | Amount of initiator | Weight average molecular weight | Composition ratio of each monomer-derived repeating unit in a polymer | | |
|---|---|---|---|---|---|
| | (wt %) | (g/mol) | BMA | MMA | VAc |
| Preparation Example 1 | 0.30% | 695,000 | 44 | 11 | 45 |
| Preparation Example 2 | 0.50% | 510,000 | 44 | 11 | 45 |
| Preparation Example 3 | 1.20% | 440,000 | 45 | 11 | 44 |
| Preparation Example 4 | 0.15% | 770,000 | 43 | 11 | 46 |
| Preparation Example 5 | 2.30% | 360,000 | 56 | 13 | 32 |

The composition ratio of each monomer-derived repeating unit in the polymer based on the acryl-based copolymer was measured by using an NMR equipment.

Example 1

Manufacture of Separator

The acryl-based copolymer according to Preparation Example 1 was dissolved in acetone to prepare a first binder solution having a solid of 5 wt %, a PVdF-based polymer (KF9300, Kureha Corp., Mw: 1,200,000 g/mol) was dissolved in a mixed solvent of acetone and DMAc to prepare a second binder solution having a solid of 7 wt %. On the other hand, alumina dispersion liquid was prepared by adding alumina (LS235, Nippon Light Metal Company, Ltd.) in an amount of 25 wt % to acetone and dispersing it for 3 hours with a bead mill. The first and second binder solutions and the alumina dispersion liquid were mixed, so that the aforementioned acryl-based copolymer and the PVdF-based polymer might have a weight ratio of 8:2, the binder solid and the alumina solid might have a weight ratio of 1/5, and acetone was added thereto, so that the entire solid might be 12 wt %, preparing an adhesive layer composition. The adhesive layer composition was coated to be 4.125 μm thick on both sides of a 8 μm-thick polyethylene film (w-scope), manufacturing a separator according to Example 1.

Example 2

Manufacture of Separator

A separator having a coating thickness of 4.25 μm according to Example 3 was manufactured according to the same method as Example 1 except for using the acryl-based copolymer according to Preparation Example 2 instead of the acryl-based copolymer according to Example 1.

Example 3

Manufacture of Separator

A separator having a coating thickness of 4.75 μm according to Example 3 was manufactured according to the same method as Example 1 except for using the acryl-based copolymer according to Preparation Example 3 instead of the acryl-based copolymer according to Example 1.

Example 4

Manufacture of Separator

A separator having a coating thickness of 4.12 μm according to Example 4 was manufactured according to the same method as Example 1 except for using no second binder solution in Example 1.

Comparative Example 1

Manufacture of Separator

A separator having a coating thickness of 4.125 μm according to Comparative Example 1 was manufactured according to the same method as Example 1 except for using the acryl-based copolymer according to Preparation Example 4 instead of the acryl-based copolymer according to Preparation Example 1.

Comparative Example 2

Manufacture of Separator

A separator having a coating thickness of 3.98 μm according to Comparative Example 2 was manufactured according to the same method as Example 1 except for using the acryl-based copolymer according to Preparation Example 5 instead of the acryl-based copolymer according to Preparation Example 1.

Experimental Example

Air permeation and a transfer rate of a negative active material after charge and discharge regarding the separators according to Examples 1 to 4 and Comparative Examples 1 and 2 were measured in the following method and provided in Table 4.

then, drying and compressing it. An electrolyte solution including 1.5 M $LiPF_6$ (Pannax ETEC Co., Ltd.) mixed with an organic solvent of EC/EMC/DEC+0.2% LiBF4 +5.0% FEC +1.0% VC+3.00% SN+1.0% PS+1.0% SA was used.

The separators according to Examples and Comparative Examples were respectively disposed between the positive and negative electrodes and wound therewith to obtain each 7 cm×6.5 cm electrode assembly, and each electrode assembly was prepared as two samples.

The electrode assembly was primarily compressed at 100° C. for 3 seconds under a pressure of 9.0 kgf/$cm^2$ and put in an aluminum coating pouch (8 cm×12 cm), two neighboring edges of the pouch were sealed at 143° C., 6.5 g of the electrolyte solution was injected therein, and a degassing machine was used to seal the pouch for 3 minutes to remove all the air in a battery cell. The manufactured battery cell was primarily aged for 12 hours at 25° C. and secondarily compressed at 100° C. for 120 seconds under a pressure of 9.0 kgf/$cm^2$. Subsequently, after aging the electrode assembly for 12 hours at 25° C., the battery cell was pre-charged at 4.35 V and 0.2 C for 1 hour to remove gas therein and then, charged and discharged under a charge/discharge/charge condition provided in Table 1 and decomposed, and then, an image that the active material in the negative electrode was transferred into the separator was taken (a high resolution camera, Lumenera Corp.), and an area that the active material was transferred was measured by using an image analyzer (Easy Measure converter 1.0.0.4).

| Charge/Discharge/Charge | (Charge) 4.35 V, 0.2C, 50 mA cut-off | 5 hrs |
|---|---|---|
| | (Discharge) 0.2 C, 3 V cut-off | 5 hrs |
| | (Charge) 0.5 C, 4.35 V cut-off | 2 hrs |

As shown in Table 4, Examples 1 to 4 using an acryl-based copolymer having a weight average molecular weight in a range of 400,000 g/mol to 750,000 g/mol as an adhesive

TABLE 4

| | | Ex. 1 | Ex. 2 | Ex. 3 | Ex. 4 | Comp. Ex. 1 | Comp. Ex. 2 |
|---|---|---|---|---|---|---|---|
| Air permeation (sec/100 cc) | | 157 | 250 | 257 | 212 | 221 | 187 |
| Negative electrode transfer rate after charge and discharge (%) | first | 70 | 92 | 73 | 70 | 35 | 6 |
| | second | 76 | 77 | 95 | 73 | 21 | — |

1. Air Permeation

The separators according to Examples and Comparative Examples were respectively cut into a size accommodating a circle having a diameter of 1 inch could at ten different points to obtain ten samples, and an air permeation measuring device (Asahi Seico Co., Ltd.) was used to measure time taken until each sample passed 100 cc of air. The time was five times repetitively measured regarding each separator and averaged, obtaining air permeation.

2. Transfer Rate of Negative Active Material after Charge and Discharge

A positive electrode having a total thickness of 108 μm was manufactured by coating LCO ($LiCoO_2$) as a positive active material to be 94 μm thick on both sides of a 14 μm-thick aluminum foil and then, drying and compressing it. A negative electrode having a total thickness of 128 μm was manufactured by coating natural graphite and artificial graphite in a ratio of 1:1 as a negative active material to be 94 μm thick on both sides of a 8 μm-thick copper foil and layer binder showed greater than 60% of a transfer rate of a negative active material after charge and discharge and thus maintained shape stability due to strong adherence between separator and negative electrode after the charge and discharge, while Comparative Example 1 using an acryl-based copolymer having a weight average molecular weight of greater than 750,000 g/mol or Comparative Example 2 using an acryl-based copolymer having a weight average molecular weight of less than 400,000 g/mol showed a largely deteriorated transfer rate of a negative active material after charge and discharge.

What is claimed is:
1. A separator, comprising:
a porous substrate and an adhesive layer on at least one surface of the porous substrate, the adhesive layer including a copolymer that consists essentially of repeating units derived from a (meth)acrylate monomer and an acetate group-containing monomer, the copoly- mer having a weight average molecular weight of 400,000 g/mol to 750,000 g/mol.

2. The separator of claim 1, wherein the acetate group-containing monomer includes one or more of vinyl acetate or allyl acetate.

3. The separator of claim 2, wherein the (meth)acrylate-based monomer includes one or more of butyl (meth)acrylate, propyl (meth)acrylate, ethyl (meth)acrylate, and methyl (meth)acrylate.

4. The separator of claim 1, wherein the copolymer is prepared by a polymerization reaction of butyl (meth)acrylate, methyl (meth)acrylate, and one or more of vinyl acetate or allyl acetate, in a mole ratio of 3 to 5:0.5 to 1.5:3.0 to 6.5.

5. The separator of claim 1, wherein the adhesive layer further comprises an inorganic particle.

6. The separator of claim 1, wherein the adhesive layer further comprises a polyvinylidene fluoride-based polymer.

7. The separator of claim 6, wherein the polyvinylidene fluoride-based polymer is a polyvinylidene fluoride-hexafluoropropylene copolymer or a polyvinylidene fluoride homopolymer.

8. The separator of claim 6, wherein a weight ratio of the copolymer and the polyvinylidene fluoride-based polymer is 9.9:0.1 to 2.5:7.5.

9. The separator of claim 6, wherein a weight average molecular weight of the polyvinylidene fluoride-based polymer is 1,000,000 g/mol to 1,500,000 g/mol.

10. The separator of claim 1, wherein the porous substrate is a porous polyolefin-based substrate.

11. A secondary battery comprising a positive electrode; a negative electrode; the separator of claim 1 between the positive electrode and the negative electrode; and an electrolyte solution.

12. The secondary battery of claim 11, wherein the secondary battery is a lithium secondary battery.

13. A separator comprising:
a porous substrate and an adhesive layer on at least one surface of the porous substrate, the adhesive layer including a copolymer that consists essentially of repeating units derived from a (meth)acrylate monomer and an acetate group-containing monomer and has a weight average molecular weight of 400,000 g/mol to 750,000 g/mol, wherein:
a transfer rate of a negative active material to the separator according to Equation 1 after charge and discharge is greater than or equal to 60%:

Transfer rate (%)=$(A_1/A_0) \times 100$     [Equation1]

wherein, in Equation 1,
$A_0$ is a total area of a negative electrode, and
$A_1$ is an area of a negative active material transferred to a separator when charge, discharge, and charge are sequentially performed after a positive electrode, a separator, and a negative electrode are sequentially stacked to form an electrode assembly, first compressing the electrode assembly at 20° C. to 110° C., for 1 second to 5 seconds, and at a force of 1 kgf/cm$^2$ to 30 kgf/cm$^2$, injecting an electrolyte solution to the compressed electrode assembly, and second compressing the same at 60° C. to 110° C., for 30 seconds to 180 seconds, at a force of 1 kgf/cm$^2$ to 30 kgf/cm$^2$.

14. The separator of claim 13, wherein the adhesive layer further comprises an inorganic particle.

15. The separator of claim 13, wherein the adhesive layer further comprises a polyvinylidene fluoride-based polymer.

16. The separator of claim 13, wherein the porous substrate is a porous polyolefin-based substrate.

17. A battery, comprising a first electrode; a second electrode; and a separator interposed between the first electrode and the second electrode, the separator including a substrate and an adhesive layer contacting the substrate, the adhesive layer including a copolymer prepared from: (a) one or more of butyl (meth)acrylate, propyl (meth)acrylate, ethyl (meth)acrylate, or methyl (meth)acrylate, and (b) one or more of vinyl acetate or allyl acetate.

* * * * *